United States Patent
Wang

(10) Patent No.: US 6,917,443 B1
(45) Date of Patent: Jul. 12, 2005

(54) COMPOSITE HALFTONE SCREENS WITH STOCHASTICALLY DISTRIBUTED CLUSTERS OR LINES

(75) Inventor: Shen-ge Wang, Fairport, NY (US)

(73) Assignee: Xerox Corporation, Stamford, CT (US)

(*) Notice: Subject to any disclaimer, the term of this patent is extended or adjusted under 35 U.S.C. 154(b) by 929 days.

(21) Appl. No.: 09/195,593

(22) Filed: Nov. 18, 1998

(51) Int. Cl.[7] .............................................. H04N 1/40
(52) U.S. Cl. ..................................... 358/1.9; 382/237
(58) Field of Search ...................... 358/1.9, 3.06–3.12, 358/3.2; 382/237–239, 251–253

(56) References Cited

U.S. PATENT DOCUMENTS

| | | | | |
|---|---|---|---|---|
| 5,050,000 A | * | 9/1991 | Ng .............................. 358/298 |
| 5,175,798 A | * | 12/1992 | Taylor et al. ................. 395/27 |
| 5,267,054 A | * | 11/1993 | Chang et al. ................ 358/456 |
| 5,475,795 A | * | 12/1995 | Taylor et al. ................. 395/27 |
| 5,841,563 A | * | 11/1998 | Effenberger ................ 359/158 |
| 5,921,937 A | * | 7/1999 | Davis et al. ................. 600/508 |

* cited by examiner

Primary Examiner—Thomas D. Lee
Assistant Examiner—Stephen Brinich

(57) ABSTRACT

A method and system of designing a digital halftoning screen for forming images on output sheets according to a set of image signals. The method generates a halftone line screen having multiple levels, each level having multiple line segments, each line segment having an equal predetermined number of elements. The method stochastically assigns threshold values to pixels corresponding to a first element within the multiple line segments of a first level and assigns a same threshold value to a pixel corresponding to a single level to create a first element stochastic fill sequence. The method then assigns threshold values to pixels corresponding to a first element within the multiple line segments of the remaining levels of the halftone line screen according to the first element stochastic fill sequence.

8 Claims, 15 Drawing Sheets

COMPOSITE HALFTONE SCREENS WITH STOCHASTICALLY DISTRIBUTED CLUSTERS OR LINES

FIELD OF THE PRESENT INVENTION

The present invention relates to a digitized rendering system as may be used in color printing systems (such as in electrophotographic and ink-jet printers and copiers). More particularly, the present invention relates to an apparatus and method for implementing halftoning systems using composite screens with stochastically distributed clusters or lines so as to improve black and white and/or color output image quality.

BACKGROUND OF THE PRESENT INVENTION

In the operation of a copier or printer, particularly color machines, it is highly desirable to have a means for processing and enhancing graphical, text and pictorial images. Particularly in the case of single or multi-pass color printers, it is highly desirable that an image processing system be employed to meet a variety of image types or the particular gray levels in those image types. While the halftoning system of the present invention is quite suitable for use on xerographic printers in which aspects of it have been tested, it may be likewise highly useful with a variety of other xerographic as well as non-xerographic printing systems such as ink-jet or other printing techniques.

In the process of digital electrostatographic printing, an electrostatic charge pattern or latent image corresponding to an original or electronic document may be produced by a raster output scanner on an insulating medium. Developing the latent image with particles of granulated material to form a powder image thereof produces a viewable record. Thereafter, the visible powder image is fused to the insulating medium, or transferred to a suitable support material and fused thereto.

Development of the latent image is achieved by bringing a developer mix into contact therewith. Typical developer mixes generally comprise dyed or colored thermoplastic particles of granulated material known in the art as toner particles, which are mixed with carrier granules, such as ferromagnetic granules. When appropriate, toner particles are mixed with carrier granules and the toner particles are charged triboelectrically to the correct polarity. As the developer mix is brought into contact with the electrostatic latent image, the toner particles adhere thereto. Non-xerographic printing systems (such as ink-jet) may be more or less successful in printing high quality images of varying types in and may involve capabilities and/or efficiencies unlike those found in xerographic systems.

Various image rendering systems have been employed to include those set forth in the following disclosures which may be relevant to various aspects of the present invention. The entire contents of all the foregoing U.S. Pat. Nos. 5,673,121; 5,740,279; 5,579,446; 5,489,991; 5,438,431; 5,394,252; 5,341,228; 5,181,162; 5,111,194; 4,595,948; 4,485,397; 4,876,611; and 4,149,194 are hereby incorporated by reference.

U.S. Pat. No. 5,673,121 discloses a method and apparatus for halftoning gray or color images by stochastic screens. An idealized stochastic screen is characterized by all of the predominant color dots (black or white) uniformly distributed. The disclosed method seeks to approach this optimization by iteratively selecting pairs of threshold levels in the screen matrix, and measuring the approach to the idealized stochastic screen. The threshold values are then swapped in position to determine whether the swap improves the measurement or not. If it does, the swap is maintained. The process is iterated until the desired result is obtained.

U.S. Pat. No. 5,740,279 discloses a method of constructing a composite halftoning screen having m times n rank ordered threshold elements. A variety of optimization techniques can be employed to improve the visual appeal of the images rendered using the composite screen for a variety of image types in single or multicolored imaging applications.

U.S. Pat. No. 5,579,446 discloses a color printer system including an interactive user interface that allows a choice between one "button" automatic control of color output or multi-button control of color output, with both automatic and manual options providing independent control for color halftoning and for color correction based on the types of objects to be printed. The preferred form allows independent print-rendering options for text, graphics and photo image.

U.S. Pat. No. 5,489,991 discloses a method for generating digital halftone matrices of a selected size for use in an image processing system in which bi-level images are formed from continuous tone input images using the digital halftone matrices. In accordance with the method, a two-dimensional array of storage positions is defined for storing values. The two-dimensional array is divided into four quadrants of equal size, each quadrant having a quadrant origin, a quadrant perimeter and four subquadrants disposed around the quadrant origin.

U.S. Pat. No. 5,438,431 discloses a method and apparatus for enabling color or black/white bi-level or multi-level halftone images to be displayed or printed on various raster output devices, in particular on display or printing devices. A dither matrix $R^{c2n}$ is obtained by applying on a c-fold replication of a well-dispersed threshold matrix $D^n$ a one-to-one discrete rotation of Pythagorean angle $a=\arctan(b/a)$ or $\beta=\arctan(a/b)$ around an arbitrary point, where $\{a,b,c\}$ are Pythagorean triplets satisfying Diophantine equation $a^2+b^2=c^2$ and n is an integer. The images produced using the disclosed method are visually pleasing due to the absence: of visible artifacts and to the small typical structure size.

U.S. Pat. No. 5,394,252 teaches of the advantages of stochastic or non-periodic screening over periodic screening in the suppression of moiréeffects.

U.S. Pat. No. 5,341,228 discloses a halftoning system using a process known as a blue noise mask. Briefly, the procedure can be described as follows: 1) Starting at one gray level with a chosen dot pattern, or "seed", the process iteratively uses a Fast Fourier Transform (FFT) techniques with a "blue noise" filter to redistribute all spots in dot pattern and eliminate large visual "clumps"; 2) Next, the dot pattern is processed at the next gray level by increasing (or decreasing) certain number of black spots on the previously determined dot pattern. Existing black (or white) spots are not moved. The same filtering technique is used to distribute newly added (or subtracted) dots; 3) Step 2 is then repeated for all gray levels sequentially. At each step, the width of the blue-noise filter varies by an amount corresponding to the current gray level; 4). The summation of dot patterns for each gray levels is the blue noise mask generated. The mask is then used to generate a halftone screen.

U.S. Pat. No. 5,181,162 discloses an object-oriented document management and production system in which documents are represented as collections of logical components, or "objects", that may be combined and physically mapped onto a page-by-page layout. Stored objects are organized, accessed and manipulated through a database management system. At a minimum, objects contain basic information-bearing constituents such as text, image, voice or graphics. Objects may also contain further data specifying appearance characteristics, relationships to other objects and access restrictions.

U.S. Pat. No. 5,111,194 discloses artificial halftone processing apparatus for binarizing input image information on the basis of the densities of pixels and combining a plurality of sets of resultant binary data to produce multi-level tone information. A matrix for halftone processing is variable in size or arrangement to store a plurality of pixel data in a memory.

U.S. Pat. No. 4,595,948 discloses superposing individual dot matrices of at least two colors. A computing unit receives electrical input signals representing the image and generates and feeds corresponding electrical signal representing the individual matrices of the at least two colors to the head means for printing. The computing means includes matrix generator means for generating the matrices in such a manner that the total number of dots to be printed in all of the matrices is limited to a first predetermined value which is less than the maximum possible total number of dots which can be printed in all of said individual dot matrices, and the total number of dots to be printed in the matrices which are formed by superposed dots of different colors is limited to a second predetermined value which is less than said first predetermined value.

U.S. Pat. No. 4,485,397 describes a method for generating a non-periodic halftone distribution by determining areas of constant or nearly constant input density and by distributing a precalculated number of print dots inside each area based on a random or pseudo random number and some spatial constraints.

U.S. Pat. No. 4,876,611 describes another stochastic screening algorithm in which the print/no-print decision is based on a recursive subdivision of the print field maintaining average density over the larger print field.

U.S. Pat. No. 4,149,194 discloses an electronic signal representing the density of a scanned image electronically halftoned by combining the pictorial signal with a rectangular array of halftone screen values to form an electronic halftone image. The halftone screen values is rotated at variable angles to the original electronic image by defining a repetitive rectangular matrix representative of any predetermined halftone cell approximating a parallelogram and incorporating a shifting parameter for the repetitive rectangular matrix.

In spite of recent advances of the various digital halftone screen designs described above with respect to the corresponding U.S. Patents, analog line screens (e.g., the analog line screen technique described in U.S. Pat. No. 4,661,859) are still widely used in currently manufactured printers. The reason for the wide use of analog line screens is that these line screens provide very high line frequencies, especially true with high addressability. Also, the analog line screens show much less noise in the image output than digital stochastic screens such as described by previously referred U.S. Pat. No. 5,673,121.

Although line screens may be preferable over stochastic screens, digital line screens are difficult to implement because there are not enough gray levels simulated by a simple line halftone screen. A simple line or cluster halftone screen has only a few elements to achieve a high line or spatial frequency, thereby reducing its achievable gray levels. For example, a line screen with five elements can generate only six different binary patterns as shown by the six steps in FIG. 4.

To address this situation others have proposed using plural halftone cells to increase the number of simulated gray-levels. An example of such a proposal is described in U.S. Pat. No. 4,903,123. However, such proposals still produce visual artificial appearance in halftone image outputs that are not necessarily of a better quality than in other digital halftone screens.

In view of these many attempts to address the situation, the present invention proposes to utilize a composite screen with stochastically distributed clusters or lines. The utilization of a composite screen produces visual effects in the image outputs which are less displeasing to the viewer.

SUMMARY OF THE PRESENT INVENTION

One aspect of the present invention is a method of designing a digital halftoning screen for forming images on output sheets according to a set of image signals. The method generates a halftone line screen having multiple line segments, each line segment having an equal pre-determined number of elements and stochastically assigns threshold values to pixels corresponding to a first element within the multiple line segments.

A second aspect of the present invention is a printing system including a system for digitally halftoning images on an output sheet according to a set of image signals. The printing system includes a memory for storing a stochastic halftone line screen, the stochastic halftone line screen having multiple line segments, each line segment having an equal pre-determined number of elements, wherein threshold values for the stochastic halftone line screen are stochastically assigned to pixels corresponding to a first element within the multiple line segments and a processor for comparing the image signals to the stochastic halftone line screen for providing a rendered image on the output sheet.

A third aspect of the present invention is a method of designing a digital halftoning screen for forming images on output sheets according to a set of image signals. The method generates a halftone line screen having multiple levels, each level having multiple line segments, each line segment having an equal pre-determined number of elements; stochastically assigns threshold values to pixels corresponding to a first element within the multiple line segments of a single level to create a first element stochastic fill sequence; and assigns threshold values to pixels corresponding to a first element within the multiple line segments of the remaining levels of the halftone line screen according to the first element stochastic fill sequence.

A fourth aspect of the present invention is a printing system including a system for digitally halftoning images on an output sheet according to a set of image signals. The printing system includes a memory for storing a stochastic halftone line screen, the stochastic halftone line screen having multiple levels, each level having multiple line segments, each line segment having an equal pre-determined number of elements, wherein threshold values for the stochastic halftone line screen are stochastically assigned threshold values to pixels corresponding to a first element within the multiple line segments of a single level to create a first element stochastic fill sequence and threshold values to pixels corresponding to a first element within the multiple line segments of the remaining levels of the halftone line screen are assigned according to the first element stochastic fill sequence and a processor for comparing the image signals to the stochastic halftone line screen for providing a rendered image on the output sheet.

A fifth aspect of the present invention is a method of designing a digital halftoning screen for forming images on output sheets according to a set of image signals. The method generates a halftone line screen having multiple levels, each level having multiple line segments, each line segment having an equal pre-determined number of elements; stochastically assigns threshold values to pixels corresponding to a first element within the multiple line segments of a first level; and assigns a same threshold value to a pixel corresponding to a first element within the multiple line segments of a second level adjacent to the first level such that pixels corresponding to a first element in the adjacent first and second levels have a same threshold value.

A sixth aspect of the present invention is a printing system suitable for forming marks on a substrate at one of c possible levels of colorant, and receiving image signals represented at d possible levels, where d>c, and having a halftone processor to reduce the number of levels at which the image is represented from d levels to c levels in order to replicate gray level printing. The printing system includes a memory, storing a set of halftone threshold level signals, each threshold signal corresponding to a unique location in a halftone cell and a comparator, receiving said image signal and one of the halftone threshold signals from the memory, and producing an output signal at one of c possible levels, varying according to the comparison of the halftone threshold signal to the image signal to cause marking at a selected location on a substrate. The set of halftone threshold level signals together form a line screen matrix arranged for use with respect to the image to generate multiple line segments of printed spots within a single repetition of the screen and generated by a stochastic line screen optimization process which optimizes the screen by approximating a condition wherein at any level of the input, all line segments have the same shape and the same size and all adjacent line segments are equal-distance separated.

A seventh aspect of the present invention is a method of designing a halftone cell, for converting an image received at d levels, for reproduction at two levels, said cell having elements each corresponding to a pixel in a discrete area of an image. The method chooses a desired line segment pattern for the halftone cell; assigns threshold values to the halftone cell; generates halftone screens; calculates a quality metric, by measuring divergence from the conditions wherein at any level of the input, all line segments have the same shape and the same size and all adjacent line segments are equal-distance separated; randomly chooses a limited set of threshold values and swapping the threshold values; recalculates the quality metric and determining whether the quality metric has improved; and determines whether to keep the swap or returning the screen to its initial state based on the determination of whether the quality metric has improved.

An eighth aspect of the present invention is a method of generating threshold values appropriately positioned in a halftone cell, for converting an image received at d levels, for reproduction at c levels, where c is less than d, said cell having N elements each corresponding to a pixel in a discrete area of an image. The method selects a number of line segments for a halftone cell; determines a threshold values between 1 and N corresponding to each elements; measures a quality metric for the halftone cell, as a function of uniformity of shape and size of line segments, and distance between line segments; makes at least one swap of threshold values between elements; re-measures the quality metric; and reverses the swap of threshold values if the quality metric change is not appropriate.

Another aspect of the present invention is a method for storing a stoclustic or stochastic halftone screen having (M*N) cells and (H*K) elements in a memory device. The method stores (H*K) threshold values; stores (H*K) incremental threshold values; and stores (M*N) fill-in indices for addressing the (M*N) cells.

A further aspect of the present invention is a method for retrieving a stoclustic or stochastic halftone screen threshold value from a memory for a image location (X,Y), the halftone screen having (M*N) cells and (H*K) elements and being stored as a first set of (H*K) threshold values (T($I_p$, $J_p$)), a second set of (H*K) incremental threshold values (C($I_p$,$J_p$)), and a third set of (M*N) fill-in indices for addressing the (M*N) cells (F($I_c$,$J_c$)). The method determines the cell indices $I_c$ and $J_c$ wherein $I_c$=[(X+Y*$H_s$)/H]% M, and $J_c$=(Y/K)% N and H, K, and $H_s$ are, respectively, width, height and shift of a base halftone cell, and M and N are total numbers of columns and rows of cells in the halftone screen; determines the pixel indices $I_p$ and $J_p$, where $I_p$=(X+Y*$H_s$)% H and $J_p$=Y % K; and determines a threshold value T(X,Y), where T(X,Y)=T($I_p$,$J_p$)+C($I_p$,$J_p$)*F($I_c$, $J_c$)/$F_{max}$, where $F_{max}$ is the range of data in the third set.

Further objects and advantages of the present invention will become apparent from the following description and the various features of the present invention.

BRIEF DESCRIPTION OF THE DRAWINGS

The following is a brief description of each drawing used to describe the present invention, and thus, are being presented for illustrative purposes only and should not be limitative of the scope of the present invention, wherein.

DETAILED DESCRIPTION OF THE PRESENT INVENTION

While the present invention will hereinafter be described in connection with preferred embodiments thereof, it will be understood that it is not intended to limit the present invention to these embodiments. For a general understanding of the features of the present invention, reference is made to the drawings.

Figure 3:
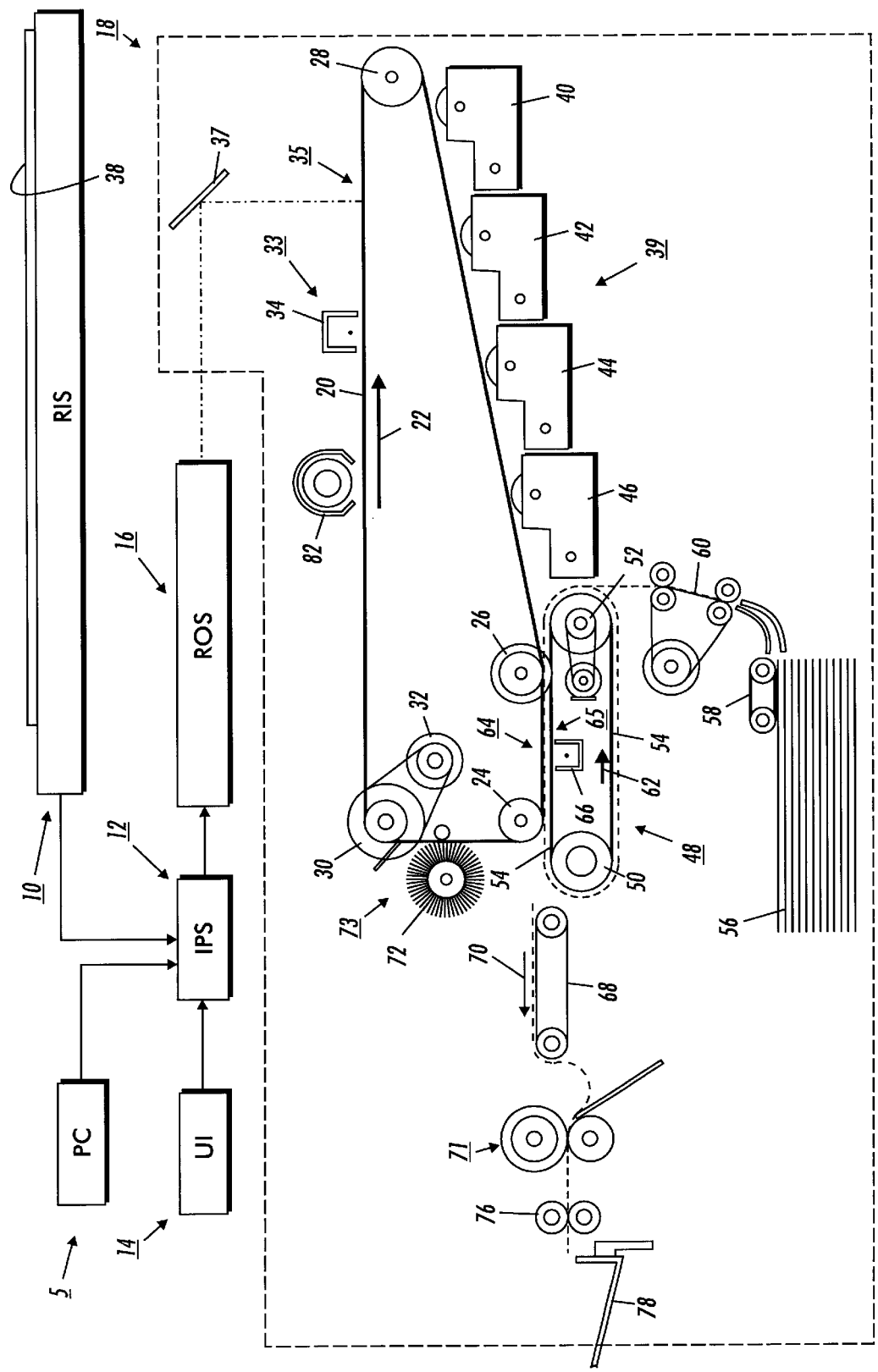
FIG. 3 is a schematic elevational view showing an exemplary color xerographic printing/copying machine and networked PC incorporating features of the present invention therein.

FIG. 3 is a schematic elevational view showing an exemplary electrophotographic printing/copying machine and a networked PC which may incorporate features of the present invention therein. It will become evident from the following discussion that the system of the present invention is equally well suited for use in a wide variety of printing and copying systems, and therefore is not limited in application to the particular system(s) shown and described herein. An ESS (electronic subsystem) or image processing station (both referred to as IPS), indicated generally by the reference numeral 12, contains data processing and control electronics which prepare and manage the image data flow to a raster output scanner (ROS), indicated generally by the reference numeral 16. A network of one or more personal computers (PC), indicated generally by the reference numeral 5, is shown interfacing/in communication with IPS 12. A user interface (UI), indicated generally by the reference numeral 14, is also in communication with IPS 12.

UI 14 enables an operator to control and monitor various operator adjustable functions and maintenance activities. The operator actuates the appropriate keys of UI 14 to adjust the parameters of the copy. UI 14 may be a touch screen, or any other suitable control panel, providing an operator interface with the system. The output signal from UI 14 is transmitted to IPS 12. UI 14 may also display electronic documents on a display screen (not shown in FIG. 3), as well as carry out the image rendering selections in accordance with the present invention as described in association with FIGS. 1 through 4 below.

As further shown in FIG. 3, a multiple color original document 38 may be positioned on (optional) raster input scanner (RIS), indicated generally by the reference numeral 10. The RIS contains document illumination lamps, optics, a mechanical scanning drive, and a charge coupled device (CCD array) or full width color scanning array. RIS 10 captures the entire image from original document 38 and converts it to a series of raster scan lines and moreover measures a set of primary color densities, i.e., red, green and blue densities, at each point of the original document. RIS 10 may provide data on the scanned image to IPS 12, indirectly to PC 5 and/or directly to PC 5.

Documents in digital or other forms may be created, screened, modified, stored and/or otherwise processed by PC 5 prior to transmission/relay to IPS 12 for printing on printer 18. The display of PC 5 may show electronic documents on a screen (not shown in FIG. 5). IPS 12 may include the processor(s) and controller(s) (not shown in FIG. 5) required to perform the adaptive image rendering system of the present invention.

IPS 12 also may transmit signals corresponding to the desired electronic or scanned image to ROS 16, which creates the output copy image. ROS 16 includes a laser with rotating polygon mirror blocks. The ROS illuminates, via mirror 37, the charged portion of a photoconductive belt 20 of a printer or marking engine, indicated generally by the reference numeral 18, at a rate of about 400 pixels per inch, to achieve a set of subtractive primary latent images. (Other implementations may include other pixel resolutions of varying types 600×600 dpi, or even asymmetrical resolutions, such as 300 X1200 dpi, both configurations of which are employed in versions of the Xerox 4900 printer family.) The ROS will expose the photoconductive belt to record three or four latent images which correspond to the signals transmitted from IPS 12. One latent image is developed with cyan developer material. Another latent image is developed with magenta developer material and the third latent image is developed with yellow developer material. A black latent image may be developed in lieu of or in addition to other (colored) latent images. These developed images are transferred to a copy sheet in superimposed registration with one another to form a multicolored image on the copy sheet. This multicolored image is then fused to the copy sheet forming a color copy.

With continued reference to FIG. 3, printer or marking engine 18 is an electrophotographic printing machine. Photoconductive belt 20 of marking engine 18 is preferably made from a photoconductive material. The photoconductive belt moves in the direction of arrow 22 to advance successive portions of the photoconductive surface sequentially through the various processing stations disposed about the path of movement thereof. Photoconductive belt 20 is entrained about rollers 23 and 26, tensioning roller 28, and drive roller 30. Drive roller 30 is rotated by a motor 32 coupled thereto by suitable means such as a belt drive. As roller 30 rotates, it advances belt 20 in the direction of arrow 22.

Initially, a portion of photoconductive belt 20 passes through a charging station, indicated generally by the reference numeral 33. At charging station 33, a corona generating device 34 charges photoconductive belt 20 to a relatively high, substantially uniform potential.

Next, the charged photoconductive surface is rotated to an exposure station, indicated generally by the reference numeral 35. Exposure station 35 receives a modulated light beam corresponding to information derived by RIS 10 having multicolored original document 38 positioned thereat. The modulated light beam impinges on the surface of photoconductive belt 20. The beam illuminates the charged portion of the photoconductive belt to form an electrostatic latent image. The photoconductive belt is exposed three or four times to record three or four latent images thereon.

After the electrostatic latent images have been recorded on photoconductive belt 20, the belt advances such latent images to a development station, indicated generally by the, reference numeral 39. The development station includes four individual developer units indicated by reference numerals 40, 42, 44 and 46. The developer units are of a type generally referred to in the art as "magnetic brush development units." Typically, a magnetic brush development system employs a magnetizable developer material including magnetic carrier granules having toner particles adhering triboelectrically thereto. The developer material is continually brought through a directional flux field to form a brush of developer material. The developer material is constantly moving so as to continually provide the brush with fresh developer material. Development is achieved by bringing the brush of developer material into contact with the photoconductive surface. Developer units 40, 42, and 44, respectively, apply toner particles of a specific color which corresponds to the complement of the specific color separated electrostatic latent image recorded on the photoconductive surface.

The color of each of the toner particles is adapted to absorb light within a preselected spectral region of the electromagnetic wave spectrum. For example, an electrostatic latent image formed by discharging the portions of charge on the photoconductive belt corresponding to the green regions of the original document will record the red and blue portions as areas of relatively high charge density on photoconductive belt 20, while the green areas will be reduced to a voltage level ineffective for development. The charged areas are then made visible by having developer unit 40 apply green absorbing (magenta) toner particles onto the electrostatic latent image recorded on photoconductive belt 20. Similarly, a blue separation is developed by developer unit 42 with blue absorbing (yellow) toner particles, while the red separation is developed by developer unit 44 with red absorbing (cyan) toner particles. Developer unit 46 contains black toner particles and may be used to develop the electrostatic latent image formed from a black and white original document. Each of the developer units is moved into and out of an operative position. In the operative position, the magnetic brush is substantially adjacent the photoconductive belt, while in the nonoperative position, the magnetic brush is spaced therefrom. During development of each electrostatic latent image, only one developer unit is in the operative position, the remaining developer units are in the nonoperative position.

After development, the toner image is moved to a transfer station, indicated generally by the reference numeral 65. Transfer station 65 includes a transfer zone, generally indicated by reference numeral 64. In transfer zone 64, the toner image is transferred to a sheet of support material, such as plain paper amongst others. At transfer station 65, a sheet transport apparatus, indicated generally by the reference numeral 48, moves the sheet into contact with photoconductive belt 20. Sheet transport 48 has a pair of spaced belts 54 entrained about a pair of substantially cylindrical rollers 50 and 53. A sheet gripper (not shown in FIG. 3) extends between belts 54 and moves in unison therewith. A sheet 25 is advanced from a stack of sheets 56 disposed on a tray. A friction retard feeder 58 advances the uppermost sheet from stack 56 onto a pre-transfer transport 60. Transport 60 advances the sheet (not shown in FIG. 3) to sheet transport 48. The sheet is advanced by transport 60 in synchronism with the movement of the sheet gripper. The sheet gripper then closes securing the sheet thereto for movement therewith in a recirculating path. The leading edge of the sheet (again, not shown in FIG. 3) is secured releasably by the sheet gripper. As belts 54 move in the direction of arrow 62, the sheet moves into contact with the photoconductive belt, in synchronism with the toner image developed thereon. In transfer zone 64, a corona generating device 66 sprays ions onto the backside of the sheet so as to charge the sheet to the proper magnitude and polarity for attracting the toner image from photoconductive belt 20 thereto. The sheet remains secured to the sheet gripper so as to move in a recirculating path for three cycles. In this way, three or four different color toner images are transferred to the sheet in superimposed registration with one another.

One skilled in the art will appreciate that the sheet may move in a recirculating path for four cycles when under color black removal is used. Each of the electrostatic latent images recorded on the photoconductive surface is developed with the appropriately colored toner and transferred, in superimposed registration with one another, to the sheet to form the multicolored copy of the colored original document. After the last transfer operation, the sheet transport system directs the sheet to a vacuum conveyor 68. Vacuum conveyor 68 transports the sheet, in the direction of arrow 70, to a fusing station, indicated generally by the reference numeral 71, where the transferred toner image is permanently fused to the sheet. Thereafter, the sheet is advanced by a pair of rolls 76 to a catch tray 78 for subsequent removal therefrom by the machine operator.

The final processing station in the direction of movement of belt 20, as indicated by arrow 22, is a photoreceptor cleaning apparatus, indicated generally by the reference numeral 73. A rotatably mounted fibrous brush 72 may be positioned in the cleaning station and maintained in contact with photoconductive belt 20 to remove residual toner particles remaining after the transfer operation. Thereafter, lamp 82 illuminates photoconductive belt 20 to remove any residual charge remaining thereon prior to the start of the next successive cycle. As mentioned above, other xerographic and non-xerographic printer hardware implementations may be used with the color or black and white halftoning systems of the present invention.

Figure 1:
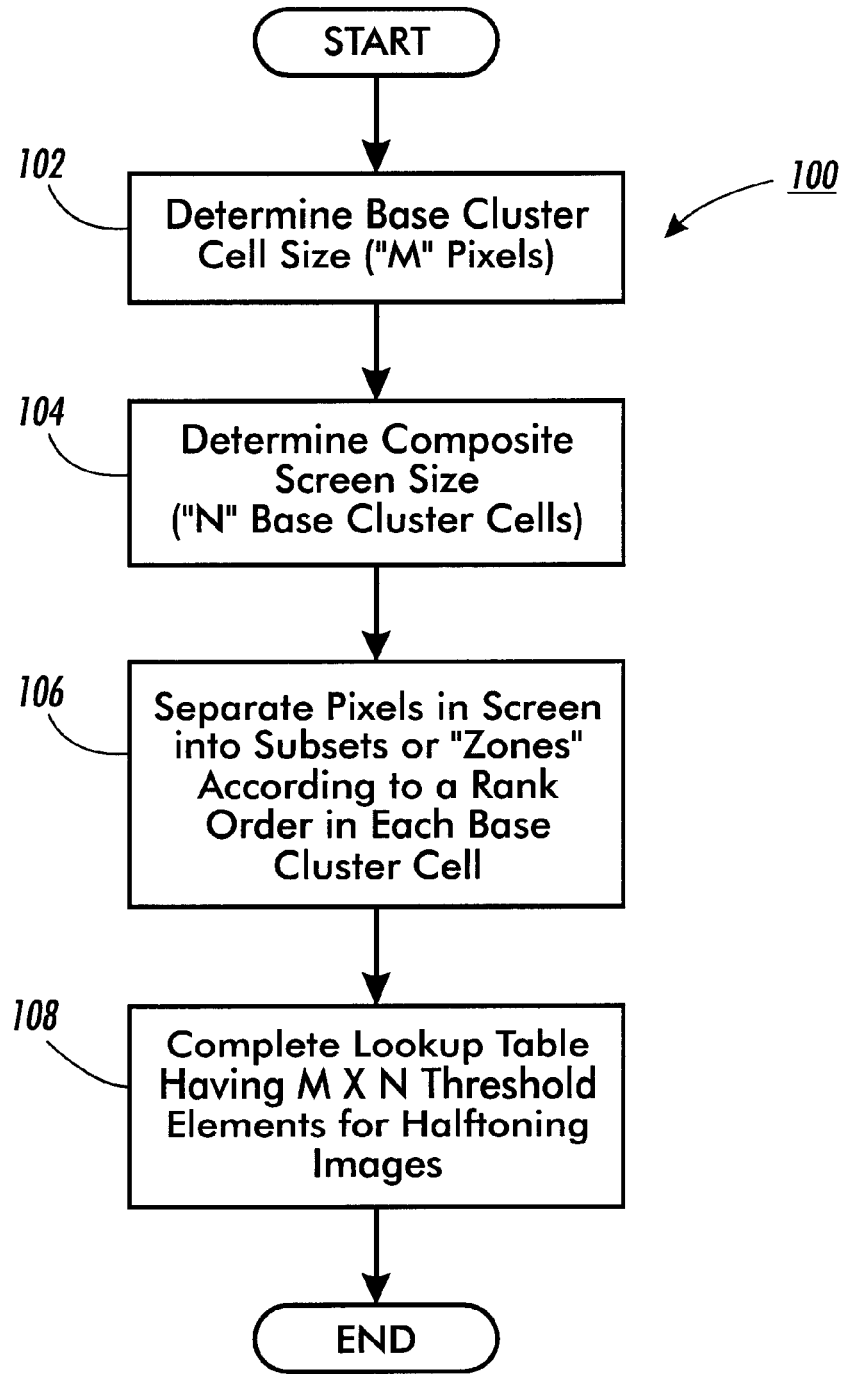
FIG. 1 is a flowchart of a generalized embodiment of the of a stochastic line screen halftoning system.
Figure 2:
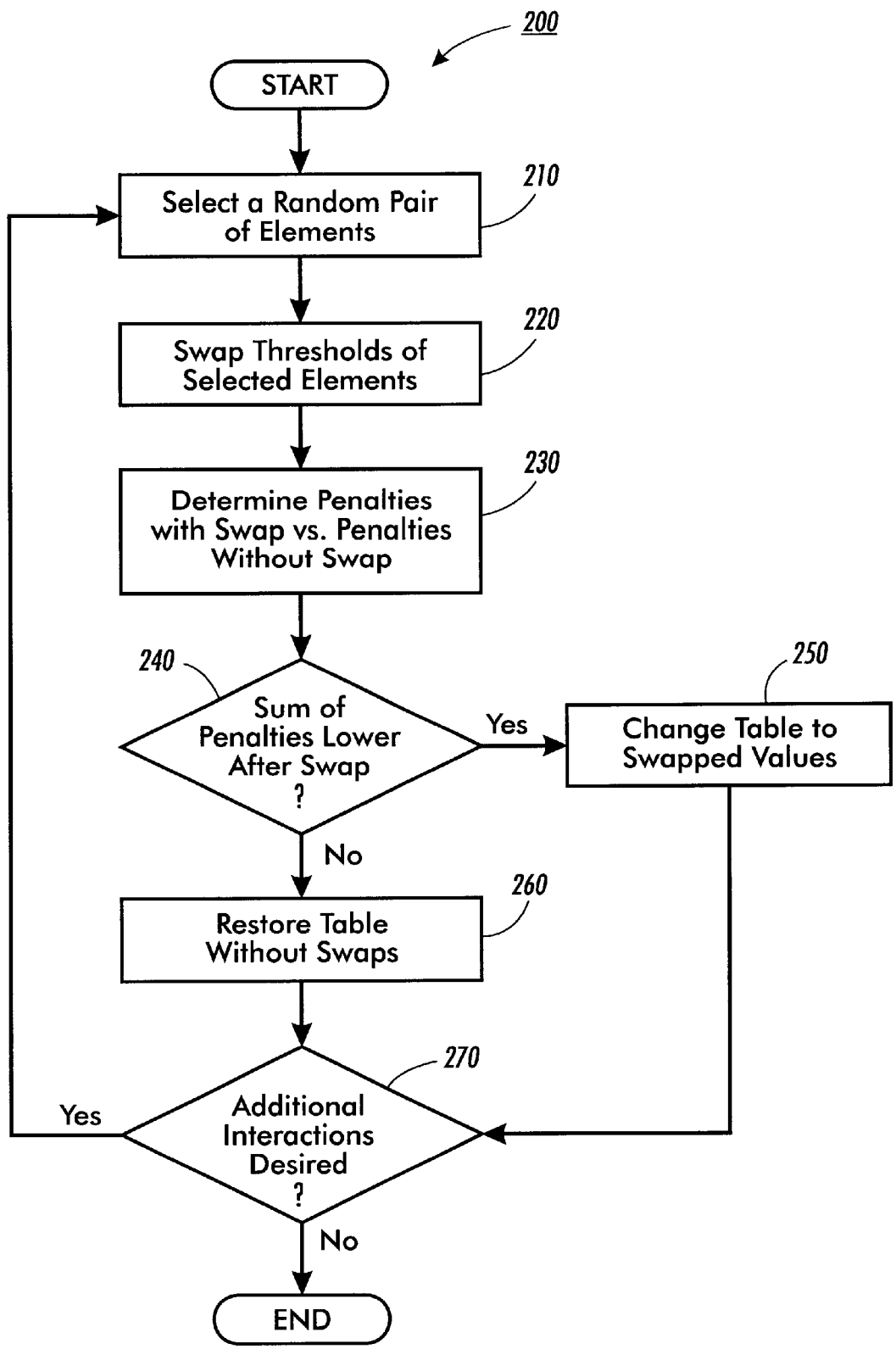
FIG. 2 is a flowchart of a generalized embodiment of the optimization system employed in embodiments of the present invention.

In conjunction with FIGS. 1 through 2, the present invention will be generally be described in terms of its application to a printer or copier such as described above in association with FIG. 3.

Printers typically provide a limited number of output possibilities, and are commonly binary; i.e., printers produce either a spot or no spot at a given location (although multilevel printers beyond binary are known). Thus, given an image or a separation in a color image having perhaps 256 possible density levels, a set of binary printer signals must be produced representing the contone effect. In such arrangements, over a given area in the separation having a number of contone pixels therein, each pixel value in an array of contone pixels within the area is compared to one of a set of preselected thresholds as taught, for example, in U.S. Pat. No. 4,149,194. The effect of such an arrangement is that, for an area where the image is a contone, some of the thresholds will be exceeded; i.e., the image value at that specific location is larger than the value of the threshold for that same location, while others are not. In the binary case, the pixels or cell elements for which the thresholds are exceeded might be printed as black or some color, while the remaining elements are allowed to remain white or uncolored, dependent on the actual physical quantity described by the data.

Since usually the image is much larger than the area of preselected threshold set, or commonly called halftone screen, the screen is repeatedly applied, or tiled, over the image, and the described halftoning or dithering method produces an output pattern that is periodic or quasiperiodic in the spatial coordinates.

In the following discussion, the contone input image value $G(i,j)$ represents the reflectance at the location with spatial coordinates $(i,j)$ and usually is normalized between 0 to 255 for black to white. The thresholding rule applied is that if the input value $G(i,j)$ is not less than the threshold value $T(i,j)$ of the corresponding element of the halftone screen, the binary output signal B(i,j) is 1, or white; else B(i,j) is 0, or black, i.e., If $G(i,j)>=T(i,j)$, $B(i,j)=1$, else $B(i,j)=0$.

The present invention proposes a digital stochastic line screen to be utilized with gray or color image rendering. While this new type of line screen maintains advantages of an analog line screen, the high resolution and the simplicity of the basic line structure, it also overcomes the major shortcomings of analog line screens. These shortcomings include less simulated gray-levels; rough transitions in both the highlight and shadow areas; minimal gamut; and unsatisfactory color stability. In other words, the present invention provides multiple-line structure to yield more simulated gray-levels; stochastic line growth to achieve smooth gray-level transitions in both highlight and shadow regions; line rotations with selected angles for different channels to provide Moiré-free color outputs extended to the maximal gamut; and controlled minimal line widths to satisfy the required color stability. The main advantage of line screens is that line screens can provide very high line frequencies with much less noise on outputs than digital stochastic screens.

The present invention also proposes a digital composite screen with stochastically distributed clusters or lines to be utilized with gray or color image rendering. The present invention provides multiple-cluster or multiple-line structure to yield more simulated gray-levels; stochastic cluster or line growth to achieve smooth gray-level transitions in both highlight and shadow regions; line rotations with selected angles for different channels to provide Moiré-free color outputs extended to the maximal gamut; and controlled minimal line widths to satisfy the required color stability.

A simple digital cluster or line screen with only few elements does not provide enough simulated gray levels. For example, a simple line screen with five elements can generate only six different binary patterns shown as six steps in FIG. 4. On the other hand, a simple cluster or line screen with too many elements will possess a low spatial line frequency, which yields visible and displeasing cluster or line structures on halftone outputs.

In the following discussion, a composite halftone screen with stochastically distributed line segments will be used to illustrate the principles of the present invention. However, the same principles can be equally applied to the cases with stochastically distributed clusters. Thereof, it is intended to embrace any modifications in replacing line segments by clusters into the scope of the following discussion.

Figure 4:
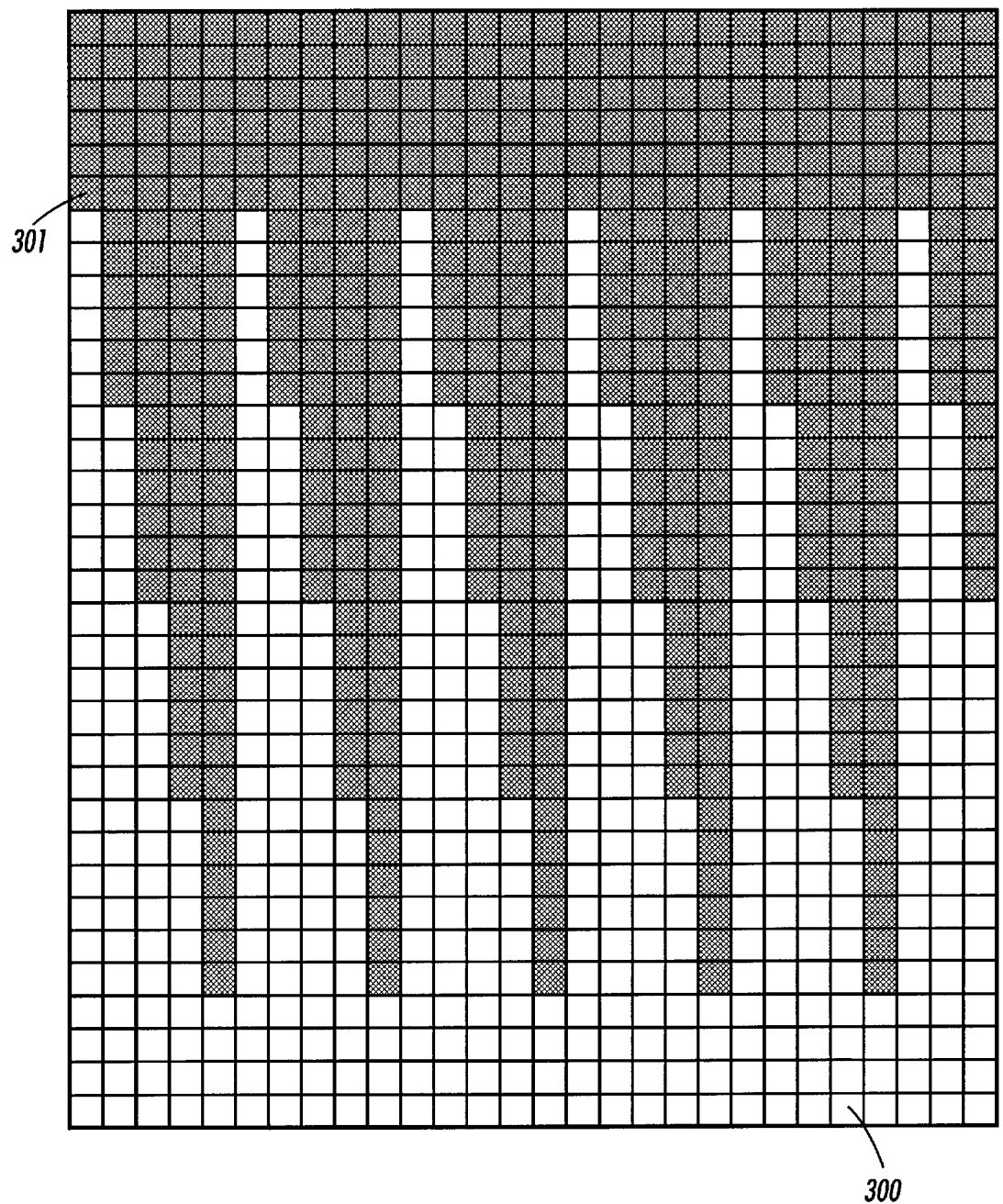
FIG. 4 illustrates a six step pattern with a five element line screen.

Considering a basic line screen with L elements, represented by L different threshold values, $T_1, T_2, \ldots, T_L$, where $T_1<T_2<\ldots<T_L$. Halftoning by this basic line screen can generate only L+1 different binary patterns, or L+1 simulated gray levels. FIG. 4 shows the output of halftoning by a basic line screen with L=5 elements horizontally arranged. All input image values of the first upper six rows satisfy the following inequality $G(i,j)<T_1(i,j)$, where i and j are indexes of columns and rows. Therefore, all output signals of the first six rows are $B(i,j)=0$, represented by black pixels. The input values of the next six rows satisfy $T_1(i,j)<G(i,j)<T_2(i,j)$.

Only the first element, with corresponding threshold value $T_1$ in each five-element line segment, generate a white pixel output and all other four output elements are black. The input values of the last four rows satisfy $G(i,j)>=T_5(i,j)$, And all output signals of these rows are $B(i,j)=1$, represented by white pixels. Obviously, there are only six different output patterns can be generated by the basic line screen as long as G(i,j) input values are the same within each five-element segment.

The present invention proposes a method which packs many line segments into one large halftone screen, and all segments have the same shape as the basic line screen, or the basic line segment. However, the threshold values might be different from one segment to another. The present invention includes an optimization technique which selects these threshold values so that the most visually pleasant outputs can be achieved.

Consider a basic line screen with L elements or pixels. M×N line screens or segments can be packed into one large halftone screen with altogether M×N×L elements, where M and N are integers representing numbers of line segments in columns and rows, respectively. All segments have the same shape as the basic line screen; however, instead of all first elements in the line segments have the same threshold value $T_1$, values, $T_{1\_1}, T_{1\_2}, \ldots T_{1\_M \times N}$, where $0<T_{1\_1}<=T_{1\_2}<=\ldots <=T_{1\_M \times N}<=T_1$, are stochastically assigned to M×N first elements. Similarly, values, $T_{2\_1}, T_{2\_2}, \ldots, T_{2\_M \times N}$, where $T_1<T_{2\_1}<=T_{2\_2}<=\ldots <=T_{2\_M \times N}<=T_2$, are stochastically assigned to M×N second elements, and so on.

Figure 5:
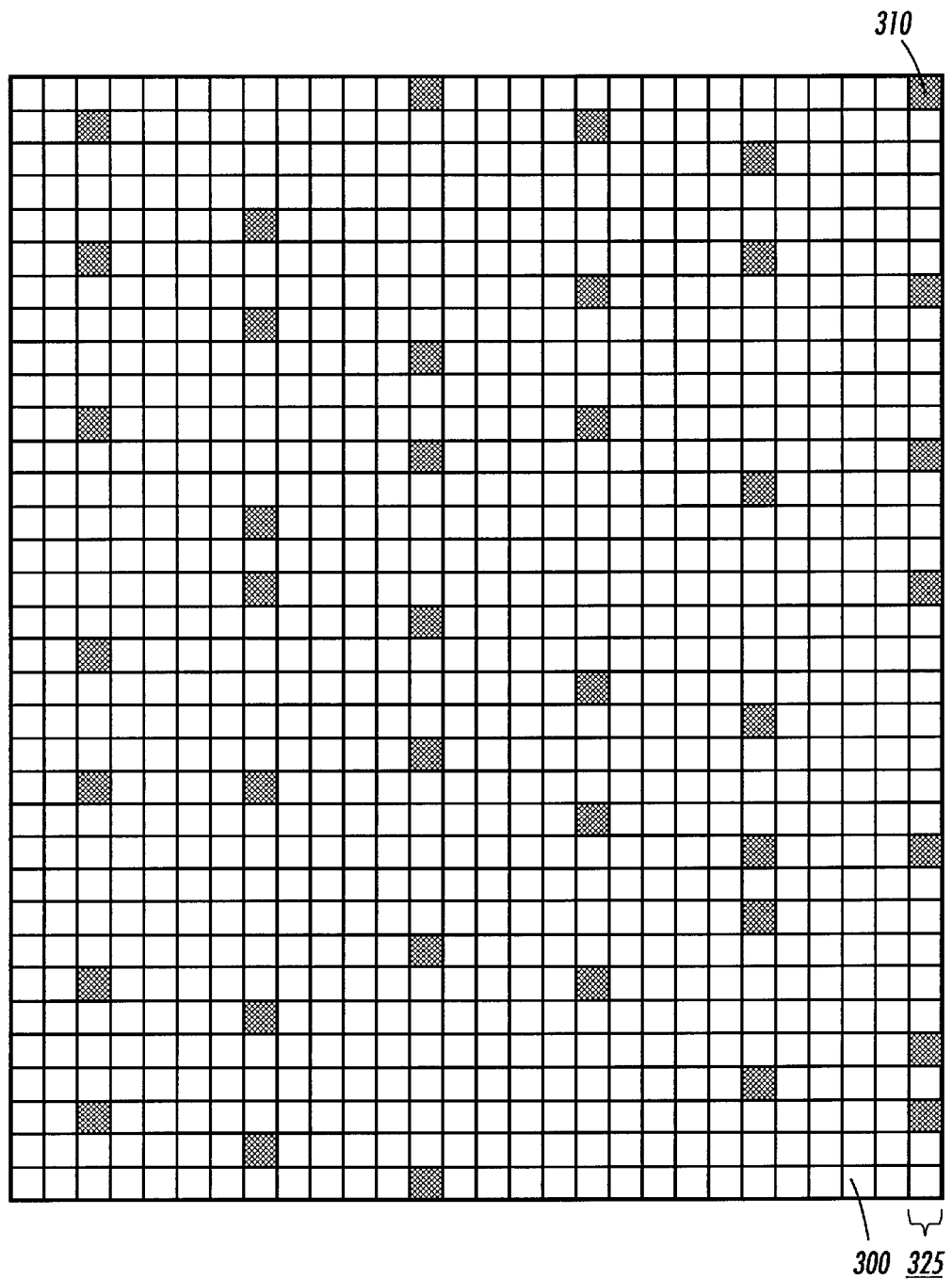
FIG. 5 illustrates an image using a line screen that produces dispersed black "dots"

To the last elements in M×N line segments, the assigned thresholds are $T_{L-1}<T_{L\_1}<=T_{L\_2}<=\ldots <=T_{L\_M \times N}<=T_L$, where $T_L$ is usually chosen equal to the possible; maximal value of the input images or the value of white. Therefore, if an input image with a constant value G, where $T_{L\_k}<=G<T_{L\_k+1}$ and $0<=k<=M \times N$, according to the thresholding rule described above, among all M×N $L^{th}$ elements there are k output pixels shown as white while other M×N−k pixels as black. Whether the output of an $L^{th}$ element from a chosen line segment shows as black or white depends on the assigned threshold value $T_{L\_i}$ for this particular pixel. If $T_{L\_i}<=T_{L\_k}$, the output is white, else black. If all M×N $L^{th}$ elements are ranked from 1 to M×N based on associated threshold values, from $T_{L-1}$ to $T_{L-M \times N}$, all pixels with higher rank orders than k, or i>k, produce black output and else white. When k=M×N, there are no black pixels and when k=0, the output, as shown in FIG. 7, is the same as one of the steps generated by the basic line screen. If k is closer to M×N than 0, the halftone output looks as dispersed black dots 310 shown in FIG. 5. In contrast, if k is closer to 0 than M×N, the dominating visual effect is dispersed "holes" 320 with an uniform background as parallel lines, shown in FIG. 6. The criterion for "the most pleasant looking," in as it would be applied to FIG. 5, is that all black dots 310 would have an equal distance to any immediate black-dot neighbors.

Figure 6:
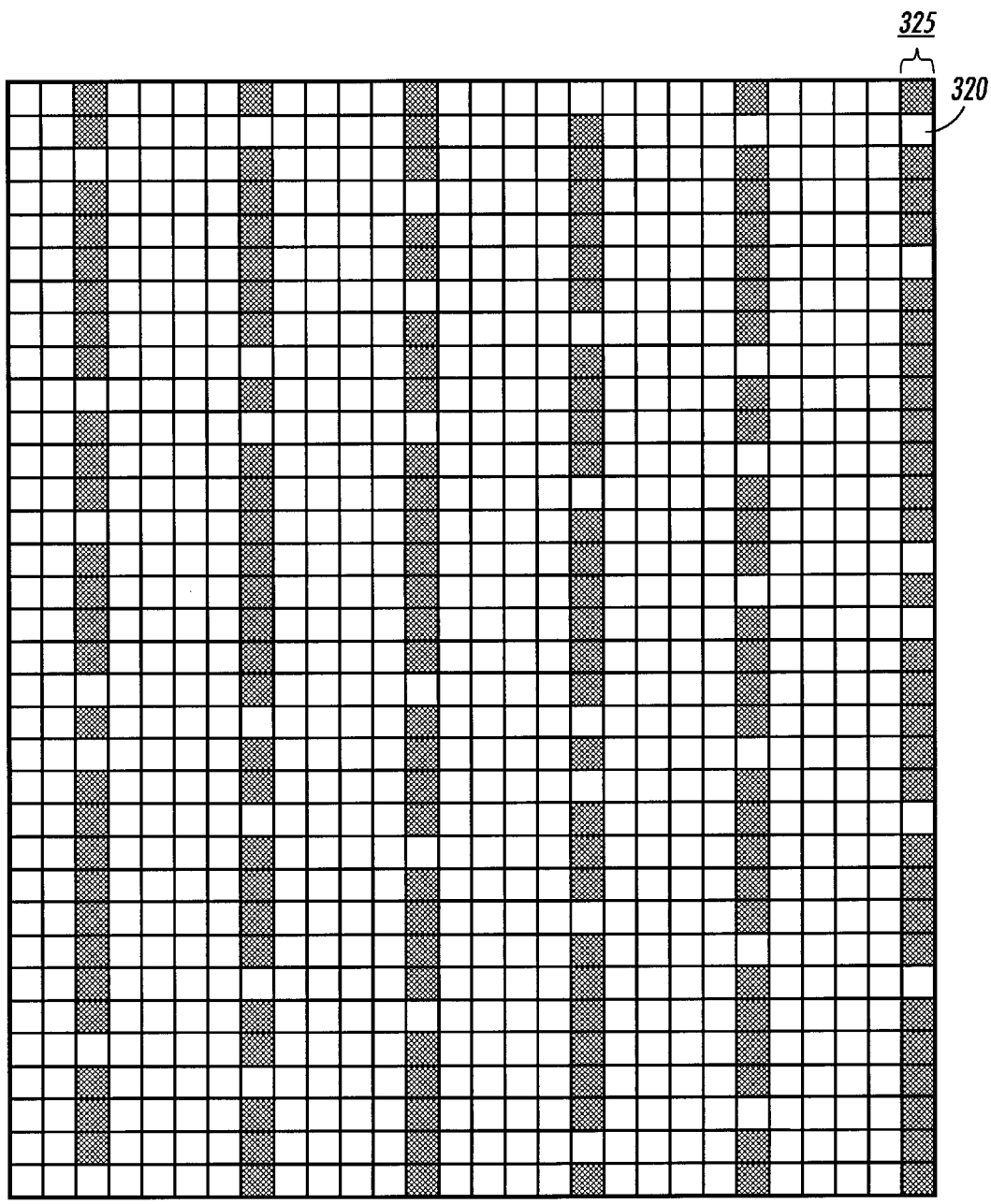
FIG. 6 illustrates an image using a line screen that produces dispersed "holes"
Figure 7:
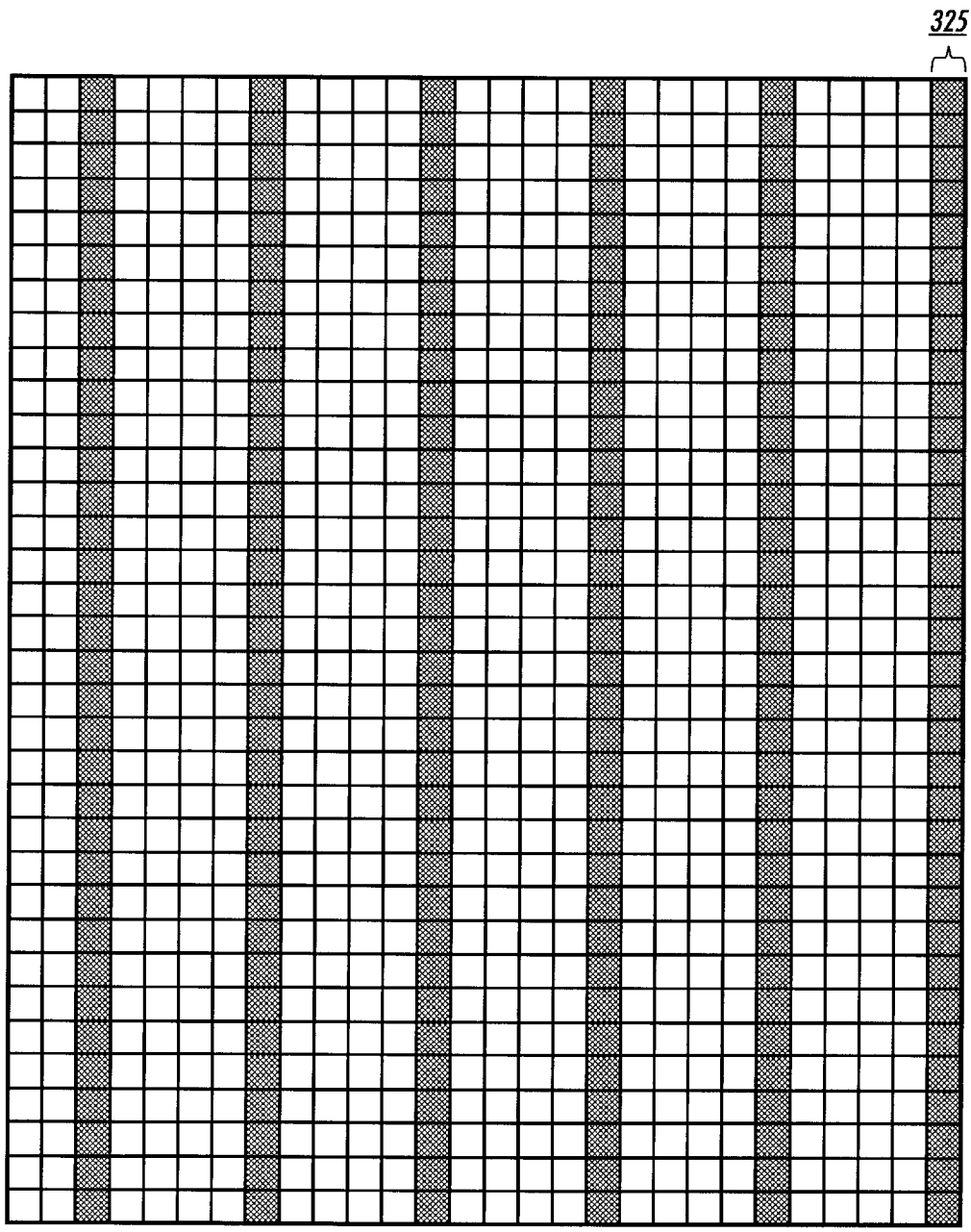
FIG. 7 illustrates an image using a line screen wherein the "holes" of FIG. 6 are filled.

For the situation as illustrated in FIG. 6, the above criterion would be applied to all pairs of "holes" 320, instead of black dots. An idealized halftone screen would generate halftone patterns with uniformly distributed black dots for any constant input in the situations as shown in FIG. 5 and uniformly distributed white "holes" for the situations as shown in FIG. 6. Obviously, the idealized output cannot be realized by halftone screens with finite numbers of elements. However, these requirements can define a merit function, which measures the departure of the real output from the idealized one. Mathematically, the following criterion can be used:

1. For the situation as shown in FIG. 5, a merit function $q_K$ is defined as $$q_K = \sum_{All\ pairs} (1/d)^2, \quad (1)$$

where d is the distance between two black-dots. In above equation, the sum could be taken over all pairs of immediate black-dot neighbors. If all black dots are truly uniformly distributed, the merit function $q_K$ reaches a minimal value. It is not difficult to see that if the sum in Equation (1) is taken over all possible pairs of black dots, instead of only immediate neighbors, $q_K$ also reaches a minimal value when all black dots are uniformly distributed. For ease of optimization, the definition for all possible pairs is taken for the following description.

2. For the situation as shown in FIG. 6, a merit function $q_W$ is defined as $$q_w = \sum_{All\ pairs} (1/d_{neighbor})^2, \quad (2)$$

where d is the distance between two white dot, and the sum is taken over all possible pairs of white "holes".

3. Sum all $q_K$ and $q_W$ over all possible levels, using $q_K$ for k above M×N/2 and $q_K$ for k below M×N/2; i.e., $$Q = \sum_k q_K + \sum_k q_W \quad (3)$$

From above above analysis it is noticed that the design of threshold values for the $L^{th}$ elements in all line segments is equivalent to searching for an optimized rank order and should follow a criterion that is similar to the one used in stochastic screen design, as described in U.S. Pat. No. 5,673,121. The same criterion can be extended to other levels too. Consider the same example with an L=5 basic line screen. The thresholds for all fourth elements in M×N line segments should meet the following inequalities:

$$T_4 < T_{4\_1} <= T_{4\_2} <= \ldots <= T_{4\_M\times N} <= T_5.$$

Figure 8:
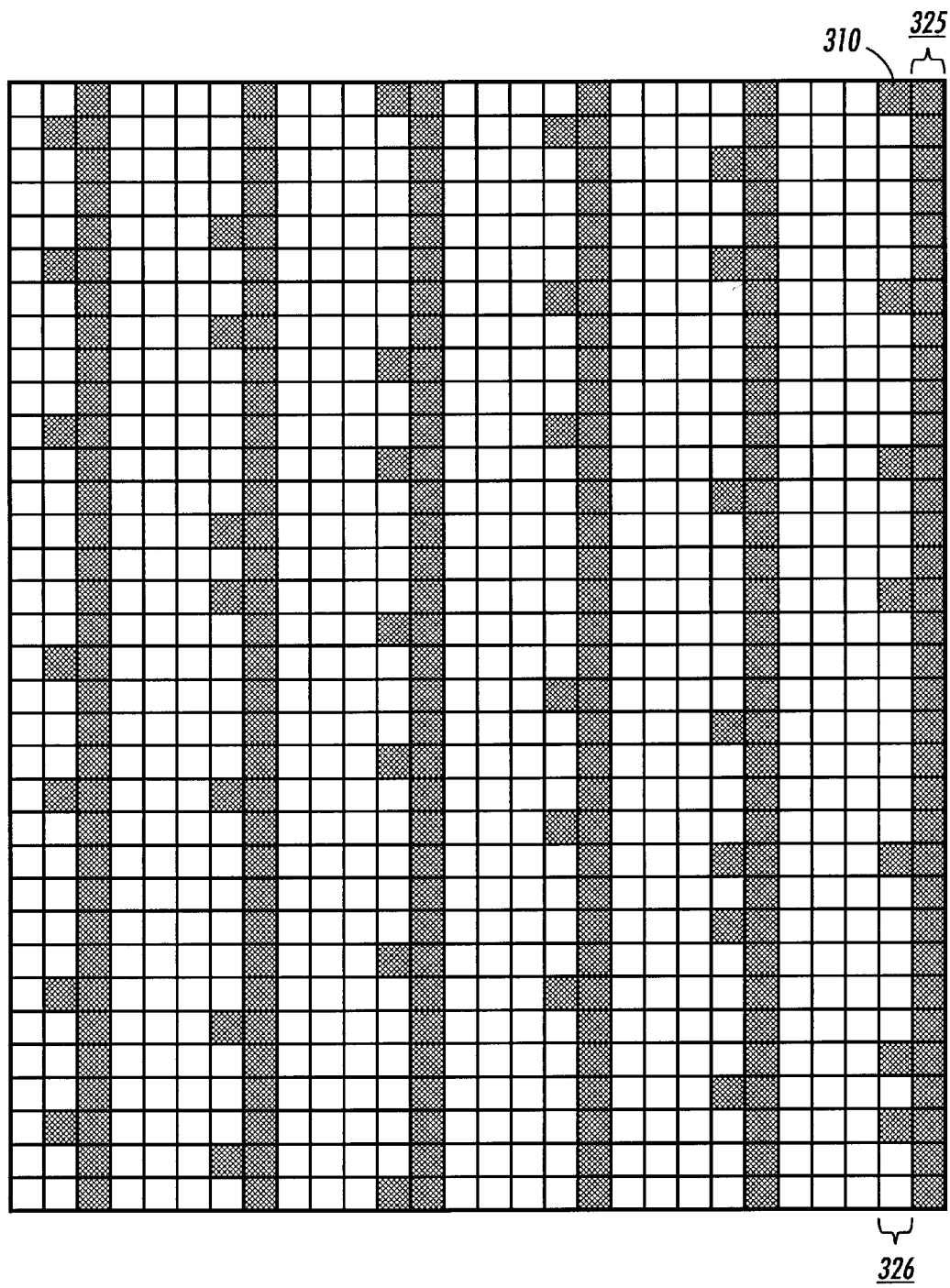
FIG. 8 illustrates an image using a line screen that produces dispersed black "bumps"
Figure 9:
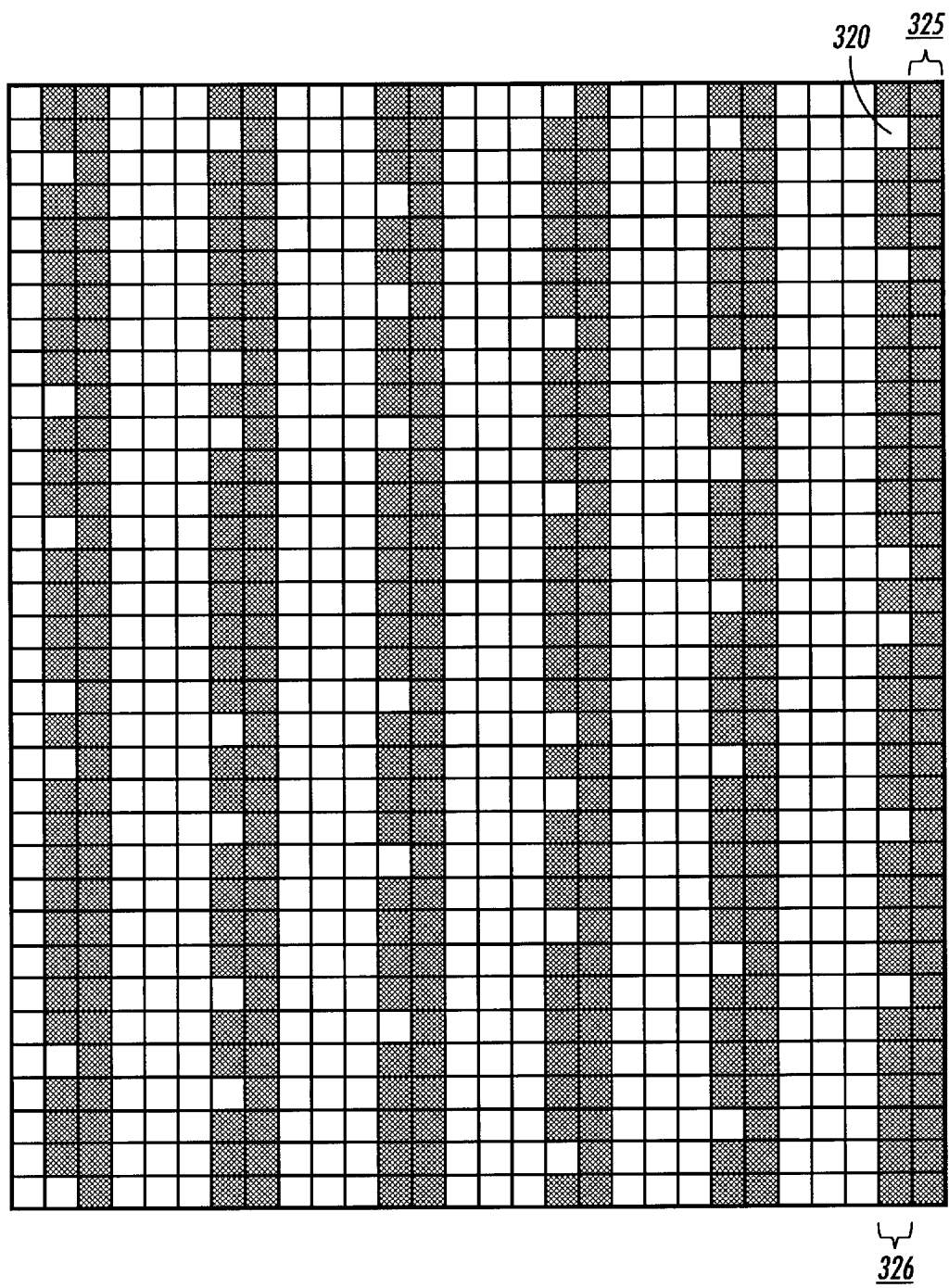
FIG. 9 illustrates an image using a line screen that produces dispersed "pit holes"
Figure 10:
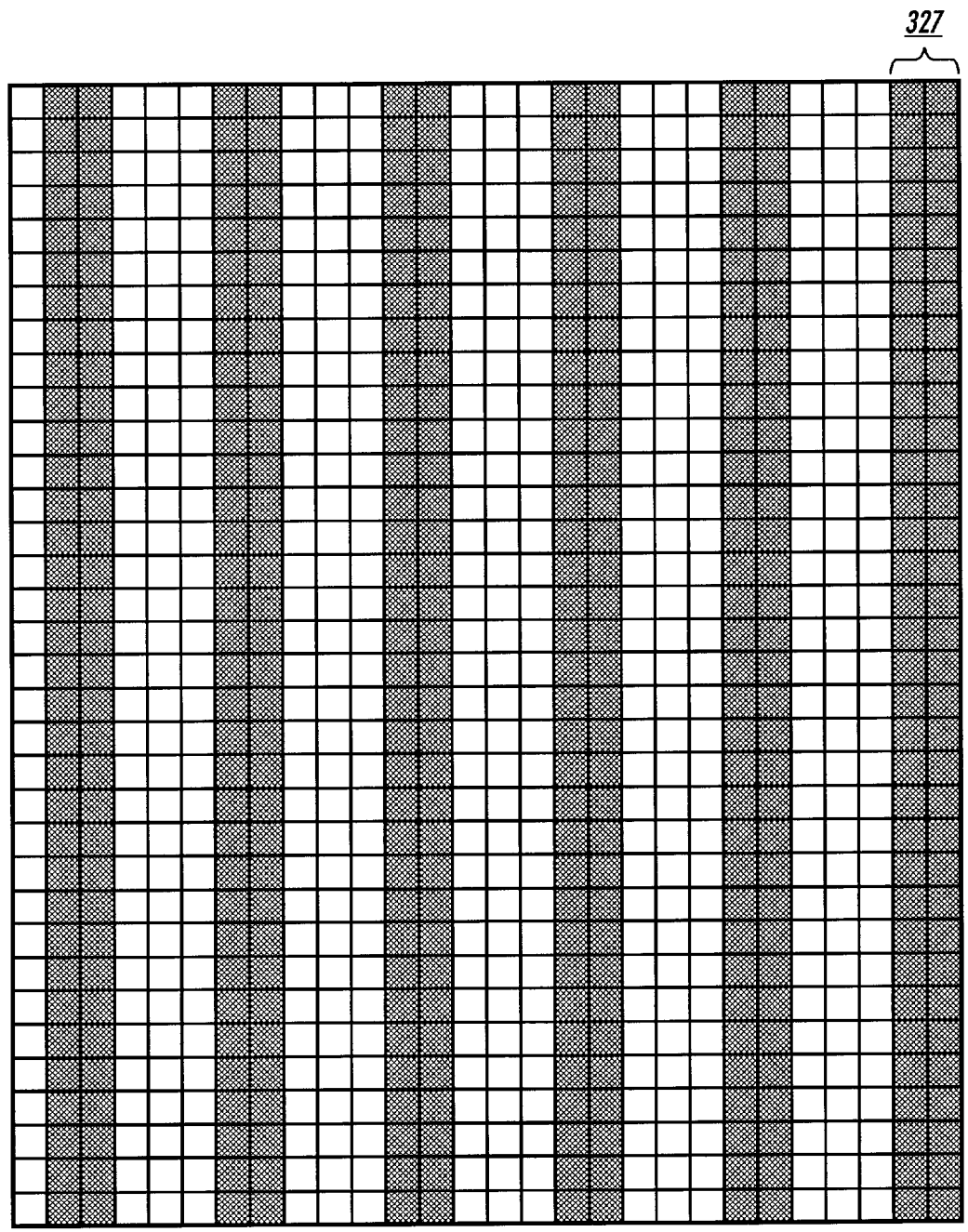
FIG. 10 illustrates an image using a line screen wherein the "pit holes" of FIG. 9 are filled.

If an input image has a constant value G where $T_{4\_k} <= G < T_{4\_k+1}$ and $0 <= k <= M\times N$, the binary output halftoned by the packed line screen shows all line segments with one or two black pixels, depending on the input value G and the assignment of the M×N threshold values at the fourth elements. When k=M×N, the output, as FIG. 7, shows the fifth elements in all M×N line segments as black and the rest as white. When k=0, the output, as FIG. 10, shows both the fourth and the fifth elements in all M×N line segments as black and the rest as white. If k is closer to M×N than 0, FIG. 8 shows the visual appearance of black "bumps" 310 dominating due to the fourth threshold values in all segments. In contrast, if k is closer to 0 than M×N, the dominating visual effect is white "pit holes" 320 in FIG. 9 due to the fourth threshold values in all segments. Since the spatial locations of all fifth elements are exactly the same as the fourth elements, as well as other levels, except for a fixed horizontal shift, an optimized stochastic distribution should be applied to all levels to avoid the "bumps and pit holes".

In other words, if the M×N line segments are ranked from 1 to M×N by an optimization process based on the merit function described by Equations (1)–(3), the same rank order can be applied to all levels for the optimal visual results.

Figure 11:
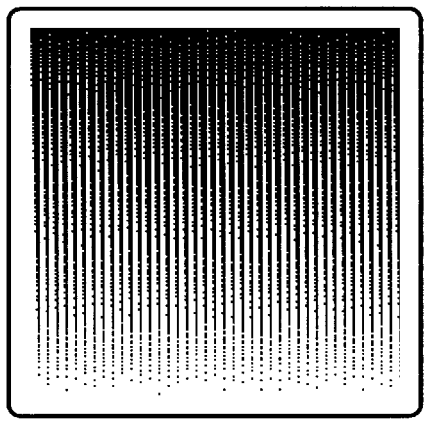
FIG. 11 illustrates an image using a stochastic line screen according to the concepts of the present invention.

In summary, a stochastic rank order or fill-in sequence for M×N locations can be optimized using a similar criterion applied to a stochastic screen design, and the optimized sequence can be used for all levels defined by the basic line screen or the basic line segment. The output of an optimized line screen with five-element basic cell is shown in FIG. 11.

FIG. 1 illustrates a flowchart that provides a general description of how a stochastic line screen system 100 may be assembled. According to block 102, a basic line screen or a basic line segment, is selected, that is the number L of pixels in each line segments. Block 104 shows the selection of the numbers of columns and rows, M and N, of basic line segments that will be used to form the composite screen. Block 106 shows the separation of all pixels in the composite screen into L subsets or zones according to the pixel location in each basic line segment. Block 108 shows the optimization system for determining the rank order of M×N pixels in each subset (as will later be described in additional detail). Block 110 shows the completion/assembly of the composite stochastic line screen having M×N×L threshold elements for halftoning images.

FIG. 2 illustrates a flowchart that provides a general description of the optimization system, shown as block 108 in FIG. 1, for determining the stochastic rank order of M×N pixels in each, subset. The optimization procedure is described as follows:

At step 200, the starting step of optimization, rank orders from 1 to M×N are assigned to the first elements of M×N line segments. This assignment can be a randomly filling, or copying from previous works; i.e., the result of previous runs of the described optimization procedure. At step 210, a pair of pixels is selected randomly from all first elements of M×N line segments. At step 220, the assigned rank orders of the two selected pixels are swapped. At step 230, the quality metrics are compared or the difference of the merit function defined by Equations (1)–(3) is found by the swapping. At step 240, if swapping results in lower penalty, keep the change at step 220. Otherwise, restore the previous values by resetting the rank orders at step 260. Repeat the iteration from steps 210 to 260 until the desired convergence is reached, by checking an iteration metric at step 270. If the requirement of the iteration metric is met, the values obtained are stored and the process is completed.

It is possible that, depending on the obtained value of the merit function, in some percentage of iterations, the changed values are kept even though they do not improve the merit function, a process known as simulated annealing.

Figure 12:
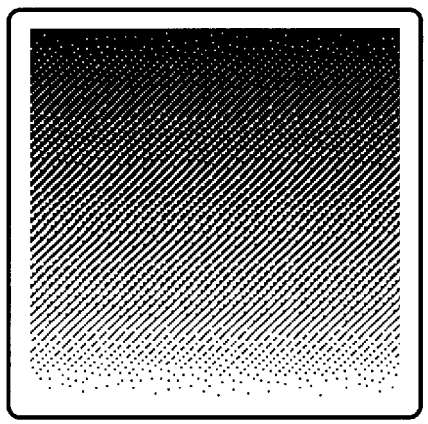
FIG. 12 illustrates an image using a rotated stochastic line screen according to the concepts of the present invention.
Figure 13:
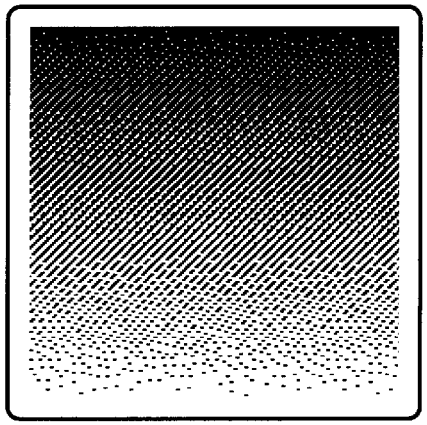
FIG. 13 illustrates an image using a rotated stochastic line screen with the two highest elements combined according to the concepts of the present invention.

For color halftoning, it is preferable to have rotated line screens, so that different channels can use line screens with different rotations. By shifting one or more pixels left or right on line segments in the next row, several different rotations can be achieved. An example with five-element basic cell and 45° rotation, according to the concepts of the present invention, is shown in FIG. 12. Sometimes, it is also preferable to combine a few levels together to avoid small isolated dots or holes. FIG. 13 shows a rotated line screen with two highest levels combined using the concepts of the present invention. Again, although the above discussion utilizes composite halftone screens with stochastically distributed line segments, the same principles can be equally applied to the cases with stochastically distributed clusters.

The following example will be explored to give a better understanding of the concepts of the present invention. A printing system forms marks on a substrate at one of c possible levels of colorant, and receives image signals represented at d possible levels, where d>c, and having a halftone processor to reduce the number of levels at which the image is represented from d levels to c levels in order to replicate gray level printing.

According to the concepts of the present invention, the printing system includes memory that stores a set of halftone threshold level signals, each threshold signal corresponding to a unique location in a halftone cell. The printing system also includes a comparator that receives the image signal and one of the halftone threshold signals from the memory and produces an output signal at one of c possible levels, varying according to the comparison of the halftone threshold signal to the image signal to cause marking at a selected location on a substrate. The set of halftone threshold level signals together forms a line screen matrix arranged for use with respect to the image to generate multiple line segments of printed spots, within a single repetition of the screen and is generated by a stochastic line screen optimization process which optimizes the screen by approximating a condition wherein at any level of the input, all line segments have the same shape and the same size and all adjacent line segments are equal-distance separated.

In other words, according to the concepts of the present invention, a desired line segment pattern for the halftone cell is chosen and threshold values are assigned to the halftone cell. The halftone screens are generated and a quality metric is calculated, by measuring divergence from the conditions wherein at any level of the input, all line segments having the same shape and the same size and all adjacent line segments being equal-distance separated. A limited set of threshold values is randomly chosen and the threshold values are swapped. The quality metric is recalculated and it is determined whether the quality metric has improved. Lastly, it is determined whether to keep the swap or return the screen to its initial state based on the determination of whether the quality metric has improved.

Furthermore, in a preferred embodiment, the selected line segment pattern provides at least four line segments in the halftone cell, and the initial assignment of the set of threshold signals is random. In the preferred embodiment, the quality metrics are given by: a centroid of each line segment where $x_o = \Sigma x/n$, $y_o = \Sigma y/n$, ($\Sigma$ is a summation of a set of coordinates x, y over any black pixels in a specified line segment); a momentum of inertia of each line segment where $m = \Sigma(x-x_o)2 + (y-y_o)2$, (where $\Sigma$ is over any black pixels; a calculated distance between two centroids is $d_{ij} = sqrt[(x_{io}-x_{jo})2 + (y_{io}-y_{jo})2]$; and a sum m and ni·nj/dij over any levels above a mean and all line segments at each level such that $Q_m = \Sigma_m$ and $Q_d = \Sigma n_i \cdot n_j / d_{ij}$, (n is a total number of black pixels in each line segment).

Lastly, in a preferred embodiment, at least two thresholds are selected for swapping in any swap. The swapping/recalculation process is repeated iteratively until an iteration metric is reached such that the iteration metric may be either a predetermined number of swaps or a percentage difference from a preselected quality metric value.

As noted above, stoclustic-cluster or stochastic-line screens can be composed of M×N cells, clusters or line-segments, which have an identical shape and L elements. Usually, such screens need M×N×L bytes of memory space to store one screen for halftoning images with a 0 to 255 input range. The cell growth of the base cell and the stochastic fill-in sequence of all cells control the outputs of such halftone screens. The cell growth defines L+1 major levels, while the stochastic fill-in sequence provides the transition from one major level to the next one.

Since one stochastic sequence can be used for all L transitions, according to the concepts of the present invention, the entire halftone screen can be stored as an M×N-element sequence plus an L-element halftone cell. For any given location, using the concepts of the present invention, the indices for both the sequence and the cell can be determined, and the threshold value for halftoning can be set-up. For example, a 192×192 stoclustic screen with a 18-element base halftone cell, using the concepts of the present invention, requires only approximately 1 k memory space instead of 36 k in the conventional screen format.

Figure 14:
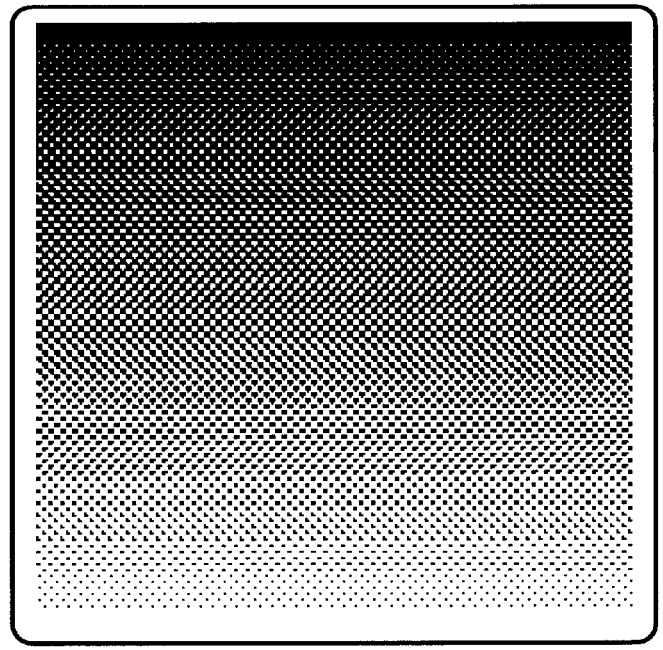
FIG. 14 illustrates an image using a conventional screen.
Figure 15:
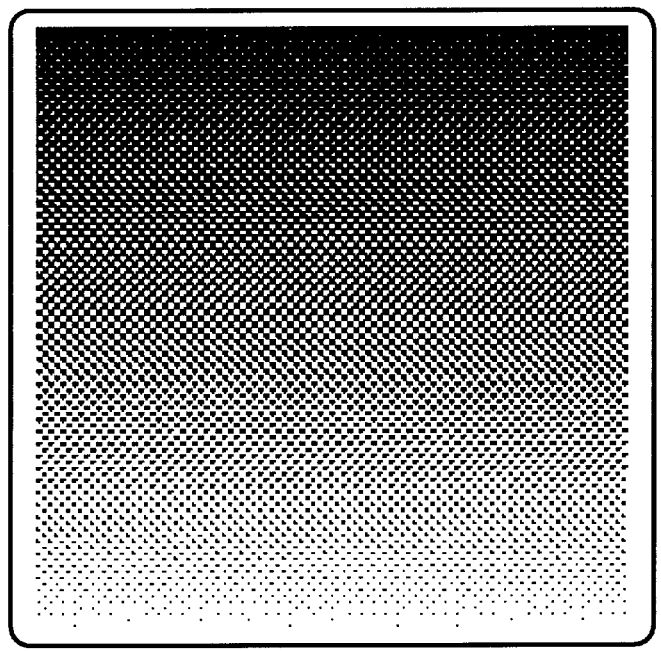
FIG. 15 illustrates an image using a stoclustic screen.

To more clearly illustrate the concepts of the present invention, a composite screen with stochastic clusters will be used. In this example, a composite screen with 192×192 elements is composed of 32×64 base cells with 18 elements and optimized for all levels. FIG. 14 is the output of a contone sweep halftoned by this base halftone cell with only 18 pixels. It is clearly seen that there are only 19 steps or 19 different halftone patterns in the output although the input has 256 levels. In contrast, the output shown in FIG. 15 by a stoclustic screen has much smoother transition from black to white because different patterns are carefully blended.

To achieve the smoother transition, the present invention utilizes a halftone screen design that is described previously by an example of the stochastic line screen. For any constant input, the halftone output has no more than two different patterns. Moreover, the present invention blends only two different patterns that are one-level apart. Lastly, the present invention optimizes the spatial minorities between the two patterns; i.e., all minority patterns should be separated as much as possible.

Figure 16:
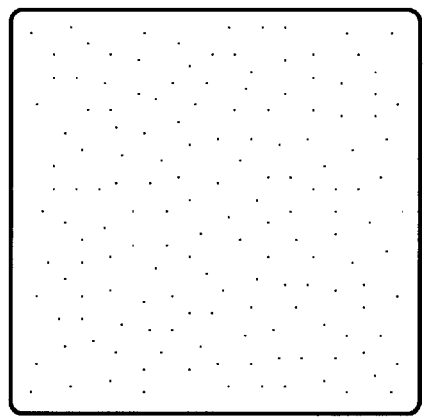
FIG. 16 illustrates an image where a halftone screen produces a pattern where single pixels are the minority.
Figure 17:
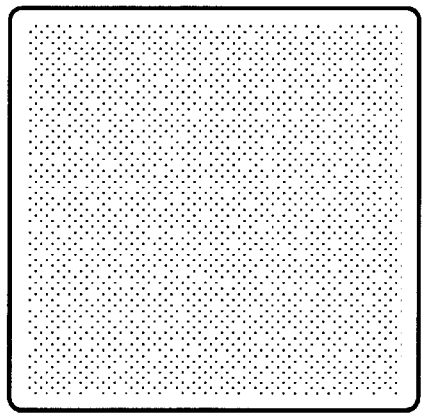
FIG. 17 illustrates an image where a halftone screen produces a pattern where white "holes" are the minority.
Figure 18:
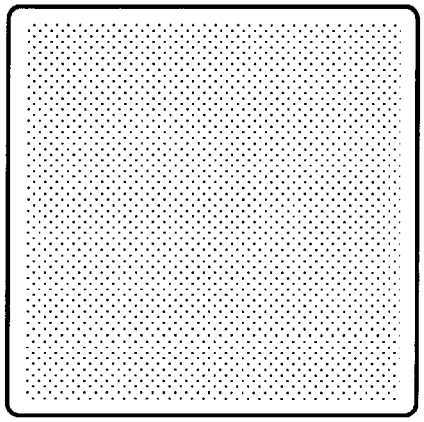
FIG. 18 illustrates a fill-in sequence for transition from complete white to complete black.

For examples, FIGS. 16 and 17 are two halftone outputs produced from different constant inputs. Both of these outputs are results of blending white patterns and single-pixel patterns, according to the concepts of the present invention discussed above. The single-pixel patterns are minorities in FIG. 16, while the white "holes" are minorities in FIG. 17. Therefore, the design of a fill-in sequence for transition from the complete white to the complete single-pixel pattern, as shown in FIG. 18, is similar to the design of a stochastic screen with 32×64 elements, which is the total number of halftone cells in the current stoclustic screen.

Figure 19:
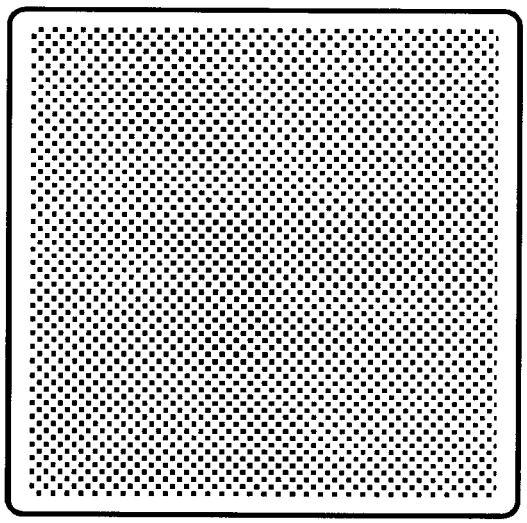
FIGS. 19 and 20 illustrate images that use four-pixel and five pixel patterns, respectively.
Figure 20:
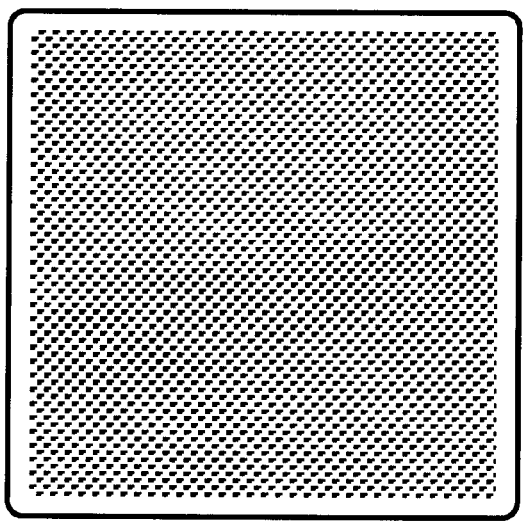
Figure 21:
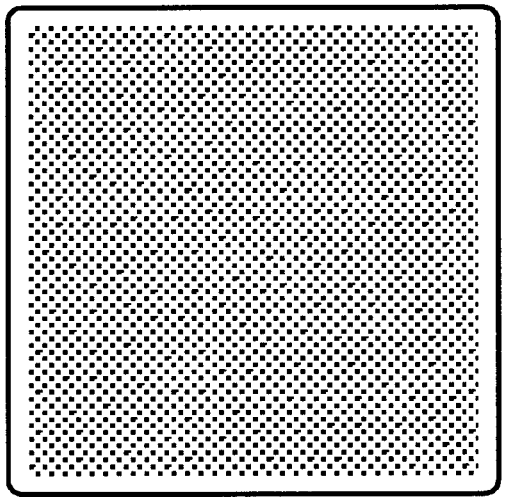
FIGS. 21 and 22 illustrate images of blending the two patterns of FIGS. 19 and 20 for a transition from FIG. 19 to 20.
Figure 22:
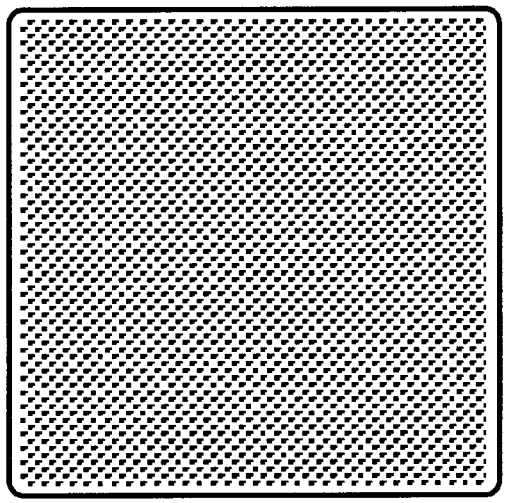

The optimized fill-in sequence can be used for all transitions from one level to the next one. For examples, FIGS. 19 and 20 are outputs having two consecutive levels composed of only four-pixel patterns or five-pixel patterns, respectively. FIGS. 21 and 22 show two examples of the possible blending of the two patterns for transition from FIG. 19 to FIG. 20. The five-pixel patterns are minorities in FIG. 21 and the four-pixel patterns, in FIG. 22.

As discussed above, it is desirable to utilize these particular screens without accruing a large need for memory space. The present invention provides a storage method for reducing the need for memory space without losing the effectiveness of these screens.

Consider a stochastic-cluster or stochastic-line screen composed of M×N number of cells, or segments, which are identical in shape to the base halftone cell with H×K number of elements. Instead of storing (M×N)×(H×K) threshold values for the entire halftone screen, three separate data sets are stored. More specifically, the present invention stores a first set of data corresponding to H×K number of values, $T(I_p,J_p)$, which are the H×K number of thresholds of the base halftone cell and $(I_p,J_p)$ is the coordinates of each pixel of the base cell with respect to the "referring" pixel in the base cell, usually defined by choosing the most upper-left one in a rectangular base cell. The present invention also stores a second set of data corresponding to H×K number of values, $C(I_p,J_p)$, which are the increments of thresholds corresponding to set 1. For example, if a threshold value, in set 1 is for the level corresponding to k-pixel pattern, $T_k$, the increment in set 2 is $C_k=T_k-T_{k+1}$. Lastly, the present invention stores a third set of data corresponding to M×N number of values, i.e., the rank orders, or fill-in indices, $F(I_c,J_c)$, which address the M×N number of cells and $(I_c,J_c)$ are the coordinates of "referring" pixel of the specific cell in the composite screen.

For 8-bit image halftoning, values in set 1 and set 2 should be also in 8-bit format and can be calibrated by conventional TRC correction methods or suitable printer modeling. The data in set-3 can be equal to or less than 8-bits, depending on the largest difference between two consecutive levels. Therefore, the total memory space needed for storing the halftone screen, according to the concepts of the present invention, is no more than (M×N)+2*(H×K) bytes. For example, to store the 192×192-element stochastic-cluster screen used for earlier illustration, four bits can be enough to specify the fill-in order for all level transitions. Hence, only 1024+2*18=1060 bytes are needed for this stochastic screen stored in the format according to the concepts of the present invention, compared to 36,864 or 36 K bytes in the conventional halftone format.

To conduct halftoning with a composite screen in this format, threshold values can be retrieved by the following operations. For a given image location (X,Y), find the cell indices $(I_c,J_c)$, (step 1) by calculating $I_c=[(X+Y*H_s)/H]\% M$, and $J_c=(Y/K)\% N$, where % is a modulus operator indicating that the remainder of the division operation is found. In these calculations, H, K, and $H_s$ are the width, height and shift of the base halftone cell, and M and N are total numbers of columns and rows of cells in the stoclustic screen. Next, (step 2) the pixel indices in the base halftone cell $(I_p,J_p)$ are found by calculating $I_p=(X+Y*H_s)\% H$ and $J_p=Y \% K$. The threshold value T(X,Y) for halftoning is given (step 3) by $T(X,Y)=T(I_p,J_p)+C(I_p,J_p)*F(I_c,J_c)/F_{max}$, where $F_{max}$ is the range of data in set 3. If data are coded in 8-bits, $F_{max}=256$; if data in 4-bits, $F_{max}=16$.

If the halftoning process is conducted sequentially, steps 1 and 2 can be conducted differently by counting and logical operations. Also, for $F_{max}$ equal to a power of 2, calculation in step 3 can be reduced to a binary operation and summation. Implementation of the threshold retrieval, according to the concepts of the present invention can be realized in either software-based or hardware-based systems.

While the present invention has been described in conjunction with preferred embodiments thereof, it is evident that many alternatives, modifications, and variations will be apparent to those skilled in the art. Accordingly, it is intended to embrace all such alternatives, modifications and variations that fall within the spirit and broad scope of the appended claims.

What is claimed is:

1. A method for storing a stoclustic or stochastic halftone screen having (M*N) cells and (H*K) elements in a memory device, comprising the steps of:
   (a) storing (H*K) threshold values;
   (b) storing (H*K) incremental threshold values; and
   (c) storing (M*N) fill-in indices for addressing the (M*N) cells.

2. The method as claimed in claim 1, wherein each stored value of said step (a) is 8-bit.

3. The method as claimed in claim 1, wherein each stored value of said step (b) is 8-bit.

4. The method as claimed in claim 1, wherein each stored value of said step (c) is equal to or less than 8-bits.

5. The method as claimed in claim 1, wherein the stored values of said step (a) are calibrated.

6. The method as claimed in claim 1, wherein the stored values of said step (b) are calibrated.

7. The method as claimed in claim 1, wherein the stored values of said steps (a) and (b) are calibrated.

8. A method for retrieving a stoclustic or stochastic halftone screen threshold value from a memory for a image location (X,Y), the halftone screen having (M*N) cells and (H*K) elements and being stored as a first set of (H*K) threshold values $(T(I_p,J_p))$, a second set of (H*K) incremental threshold values $(C(I_p,J_p))$, and a third set of (M*N) fill-in indices for addressing the (M*N) cells $(F(I_c,J_c))$, comprising the steps of:
   (a) determining the cell indices $I_c$ and $J_c$ wherein $I_c=[(X+Y*H_s)/H]\% M$, and $J_c=(Y/K)\% N$ and H, K, and $H_s$ are, respectively, width, height and shift of a base halftone cell, and M and N are total numbers of columns and rows of cells in the halftone screen;
   (b) determining the pixel indices $I_p$ and $J_p$, where $I_p=(X+Y*H_s)\% H$ and $J_p=Y \% K$; and
   (c) determining a threshold value T(X,Y), where $T(X,Y)=T(I_p,J_p)+C(I_p,J_p)*F(I_c, J_c)/F_{max}$, where $F_{max}$ is the range of data in the third set.

* * * * *